United States Patent
Anderson et al.

(10) Patent No.: US 9,430,035 B2
(45) Date of Patent: Aug. 30, 2016

(54) INTERACTIVE DRAWING RECOGNITION

(75) Inventors: Glen J. Anderson, Portland, OR (US); Cory J. Booth, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 13/977,235

(22) PCT Filed: Dec. 30, 2011

(86) PCT No.: PCT/US2011/068166
§ 371 (c)(1),
(2), (4) Date: Nov. 8, 2013

(87) PCT Pub. No.: WO2013/101206
PCT Pub. Date: Jul. 4, 2013

(65) Prior Publication Data
US 2014/0055361 A1   Feb. 27, 2014

(51) Int. Cl.
G06F 3/00       (2006.01)
G06F 3/042      (2006.01)
G06F 3/0488     (2013.01)
G06F 3/01       (2006.01)
G06K 9/00       (2006.01)
G06K 9/22       (2006.01)

(52) U.S. Cl.
CPC .............. G06F 3/005 (2013.01); G06F 3/017 (2013.01); G06F 3/0425 (2013.01); G06F 3/0426 (2013.01); G06F 3/04883 (2013.01); G06F 3/04886 (2013.01); G06F 2203/0381 (2013.01); G06K 9/00335 (2013.01); G06K 9/224 (2013.01)

(58) Field of Classification Search
None
See application file for complete search history.

(56) References Cited

U.S. PATENT DOCUMENTS

| | | | |
|---|---|---|---|
| 6,118,897 A | 9/2000 | Kohno | |
| 2003/0174125 A1 | 9/2003 | Torunoglu et al. | |
| 2004/0100508 A1 | 5/2004 | Hansson | |
| 2004/0101196 A1* | 5/2004 | Weitman | G06K 9/00442 382/173 |
| 2006/0018546 A1* | 1/2006 | Lagardere | G06K 9/222 382/186 |
| 2007/0052685 A1 | 3/2007 | Wakai | |
| 2007/0154116 A1* | 7/2007 | Shieh | G06F 3/0425 382/314 |
| 2007/1025938 | 11/2007 | Steinbock et al. | |
| 2009/0034713 A1 | 2/2009 | Lee et al. | |
| 2010/0131549 A1 | 5/2010 | Kramer et al. | |

(Continued)

FOREIGN PATENT DOCUMENTS

CN   1120868 A   4/1996
CN   1459073 A   11/2003

(Continued)

OTHER PUBLICATIONS

Search Report, PCT/US2011/068166, Intel Corporation et al., Dec. 30, 2011, 9 pages.

(Continued)

Primary Examiner — Joseph Haley
Assistant Examiner — Emily Frank
(74) Attorney, Agent, or Firm — Blakely, Sokoloff, Taylor & Zafman LLP

(57) ABSTRACT

Interactive drawing recognition is described. In one example, a command is received indicating a type of drawing and a user drawing is observed. A library of drawing templates associated with the drawing type is accessed based on the command. The observed drawing is compared to the drawing templates to identify the observed drawing, and attributes are assigned to the identified drawing.

18 Claims, 7 Drawing Sheets

(56) References Cited

U.S. PATENT DOCUMENTS

2012/0268376 A1* 10/2012 Bi ..................... G06F 3/0425
                                              345/168
2014/0028598 A1*  1/2014 Yoo ................... G06F 3/04883
                                              345/173
2015/0022461 A1*  1/2015 Kempin ............. G06F 3/04883
                                              345/173

FOREIGN PATENT DOCUMENTS

| CN | 1879143 A | 12/2008 |
| --- | --- | --- |
| CN | 101589425 A | 11/2009 |
| CN | 101840469 A | 9/2010 |
| CN | 101976114 A | 2/2011 |
| JP | 2000187551 | 7/2000 |
| JP | 20054543 | 1/2005 |
| JP | 2009-064375 | 3/2009 |
| JP | 2010204918 | 9/2010 |
| WO | WO 2007-093984 | 8/2007 |

OTHER PUBLICATIONS

"Run a program (process) with a CPU Priority (Higher or Lower) in windows vista or XP", techblissonline.com, 2008.

Search Report, PCT/US2011/068222, Intel Corporation et al., Dec. 30, 2011, 10 pgs.

European Search Report for EP Counterpart Application No. 11878604.5, 7 pgs., (Jul. 2, 2015).

Search Report from Counterpart Chinese Patent Application No. 201180076479.1, dated Mar. 16, 2016, 2 pages.

Liu Youquan, et al., "Development of a camera-based vehicle driving simulator system," Chinese Journal of Stereology and Image Analysis, vol. 15, No. 2, Jun. 2010, pp. 115-120.

European Patent Office Communication, dated Jun. 14, 2016, 6 pages.

* cited by examiner

INTERACTIVE DRAWING RECOGNITION

CROSS-REFERENCE TO RELATED APPLICATION

This patent application is a U.S. National Phase Application under 35 U.S.C. §371 of International Application No. PCT/US2011/068166, filed Dec. 30, 2011, entitled "INTERACTIVE DRAWING RECOGNITION".

BACKGROUND

Computing systems often rely on mouse and keyboard inputs to determine the appearance of digital objects that the user creates. Keyboard, mouse, and game controller inputs usually determine the behaviors of digital objects. People can draw objects and scan them into computers, allowing some freehand input, but the scanned drawings are then one single object. The user has limited opportunity for how to interact with the object, for example resizing and changing colors. A more natural method of inputting visual information would allow a richer graphical interaction with computing devices.

Tablets have been used as input devices. Typically the tablet senses the pressure of a stylus on a special surface and reproduces the drawn shapes on the screen. Tablets may also be used to modify photographs and drawings and as a pointing device similar to a mouse. In some versions, the pen rather than the drawing surface records the drawn input digitally. These pens use optic sensors and sometimes specially marked paper to sense and store drawings.

Some existing computing systems will recognize drawn objects as simple commands, as alphanumeric characters, or as matching objects in the system. These systems scan the drawing to identify it. However, the nature of these interactions is limited.

Some existing computing systems will recognize "air gestures" as simple commands, or more commonly as inputs into a computer game. The air gesture may be recognized by being observed by a camera or by the user holding a device that includes inertial sensors and then moving the device.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention provide a system to recognize drawn input in new ways. The drawn input might include, for example: a drawn a numeric keypad used as a keypad; a drawn mouse or "mousing area" used as a point and click device; a drawn game of "Line Rider" in which lines are drawn freehand and the computer generates a character to ride on the drawn lines.

Figure 1:
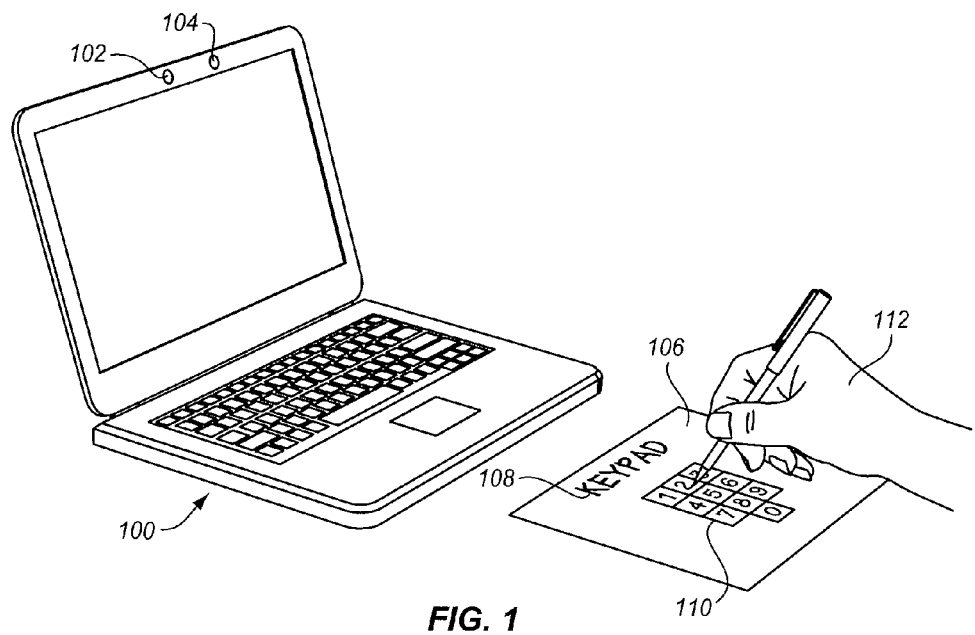
FIG. 1 is diagram of a user drawing a keypad for use with a computer system according to an embodiment of the invention.

FIG. 1 show an example of computer system suitable for use with embodiments of the present invention. The computer system 100 has a camera 102 and a microphone 104 typically used for voice and video calls. The camera may be a stereo camera for three-dimensional video calls or to allow for the interpretation of three dimensional air gestures. While a notebook style computer is shown, slate and tablet computers typically have similar hardware features. Alternatively a smart phone, smart television, media player, or portable gaming device may be used. A desktop computer may also be used when equipped with cameras and microphones as needed for the various embodiments described below.

In embodiments, the invention may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

A sheet of paper 106 is placed within view of the camera 102. The paper may be on the same desk as shown or on a nearby surface. Instead of a piece of paper any writing surface may be used such as whiteboard, chalkboard, or an electronic surface such as a display surface that detects drawing input and shows the result on the display. Using the paper or similar article a user 112 is able to draw and write any desired words and shapes. In FIG. 1, the user has written the word "keypad" 108 and then drawn a picture of a keypad 110.

The computer system observes the paper and detects the word keypad written on the paper. This may be done using any of a variety of handwriting and symbol recognition utilities depending on the particular embodiment. Having recognized the work keypad, the system then tries to identify the drawing as a keypad. The recognition of the word allows the system to limit a set of templates or shape recognition patterns to those that might correspond to a keypad. This increases the reliability and speed of the drawing recognition. Having then recognized the drawing as a keypad, the user can perform gestures with respect to the drawing of the keypad and enter number and characters as if it were a keypad.

Figure 2:
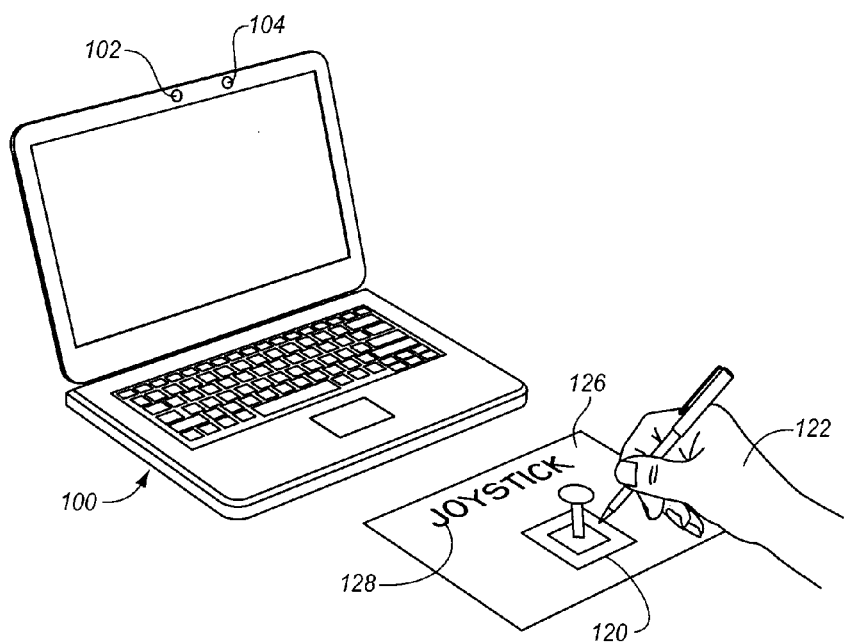
FIG. 2 is a diagram of a user drawing a joystick for use with a computer system according to an embodiment of the invention.

FIG. 2 shows a similar use of the computer system. In the example of FIG. 2, the same computer observes that the user 122 has written "joystick" 128 on a piece of paper 126. The user has then drawn something 120. The computer system based on possible drawing for joystick is able to recognize the drawn tiles 120 as some part of a joystick. The text allows the computer system to apply joystick designs and features to the drawing so that the drawing, while it does not closely resemble a joystick will be interpreted as such. In the illustrated example, the five tiles may be seen as push surfaces and a fire button, for example. The user may then touch the tiles to have the effect of joystick commands on the computer system.

Figure 3:
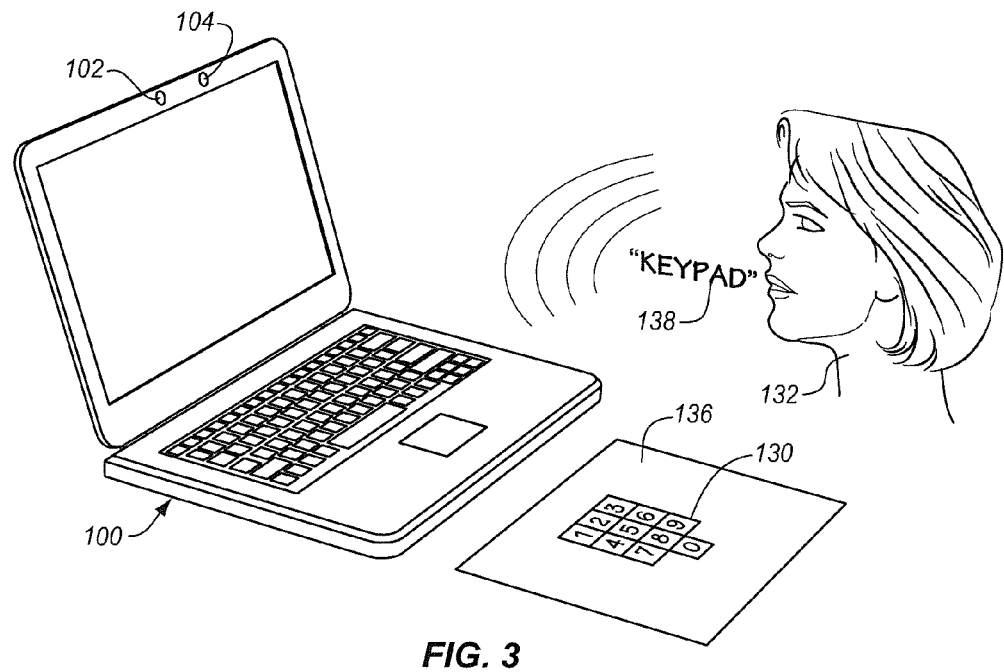
FIG. 3 is a diagram of a user drawing a keypad for use with a computer system according to another embodiment of the invention.

FIG. 3 shows another alternative embodiment in which the user 132 applies a different approach to indicating the nature of the drawn object. The user 132 has drawn a keypad 130 on a piece of paper 136, however, instead of writing a descriptive word to help the computer to recognize the drawing, the user speaks the word "keypad" 138. The computer receives the spoken utterance in the microphone 104 applies it to a speech recognition system to identify the word and then recognizes the word as "keypad."

The spoken utterance provides the computer system with an indication about the nature of the drawn object. The computer system can use this to select a set of templates associated with the word "keypad" and then recognize the features of the drawing that correspond to features of a keypad. As with the written word, there may be different words that indicate the subset of templates that the computer system is to use to identify the drawings. The user might also say or write number pad, calculator, adding machine, math, or other words.

Figure 4:
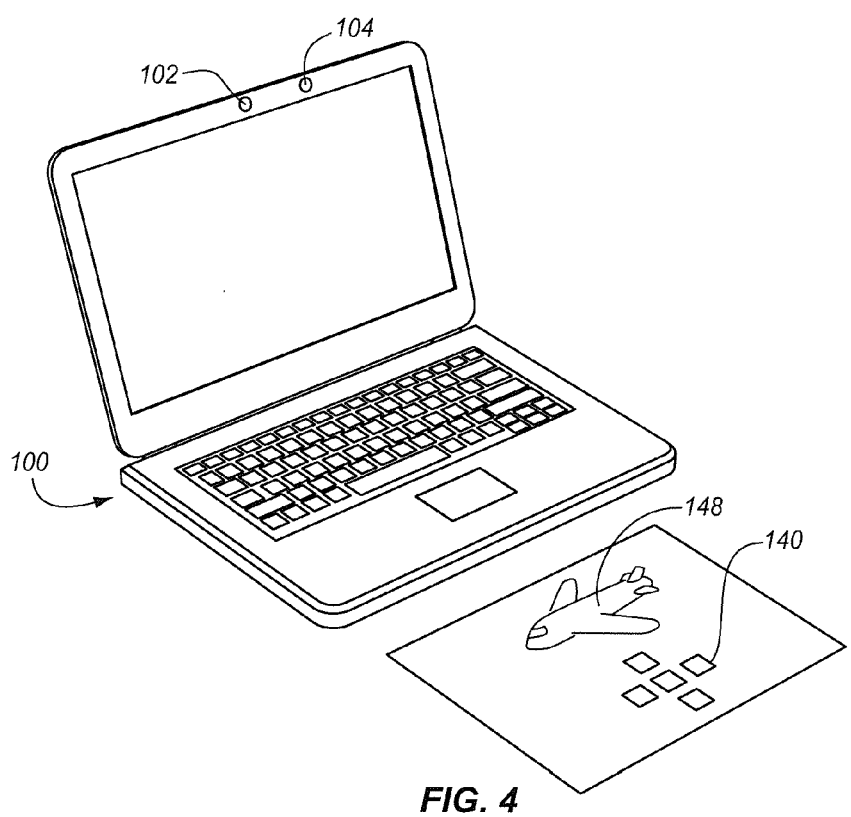
FIG. 4 is a diagram of a user drawing a joystick for use with a computer system according to another embodiment of the invention.

FIG. 4 shows a further example of aiding the computer to identify the drawing. In FIG. 4, the user has drawn a symbol 148 for an airplane. The computer has observed this drawing and recognized it on the paper 146. When the user then draws the 5 tiles 140, the computer system accesses a template library associated with the airplane symbol. This leads to associating the drawn joystick with joystick controls and commands.

Figure 5:
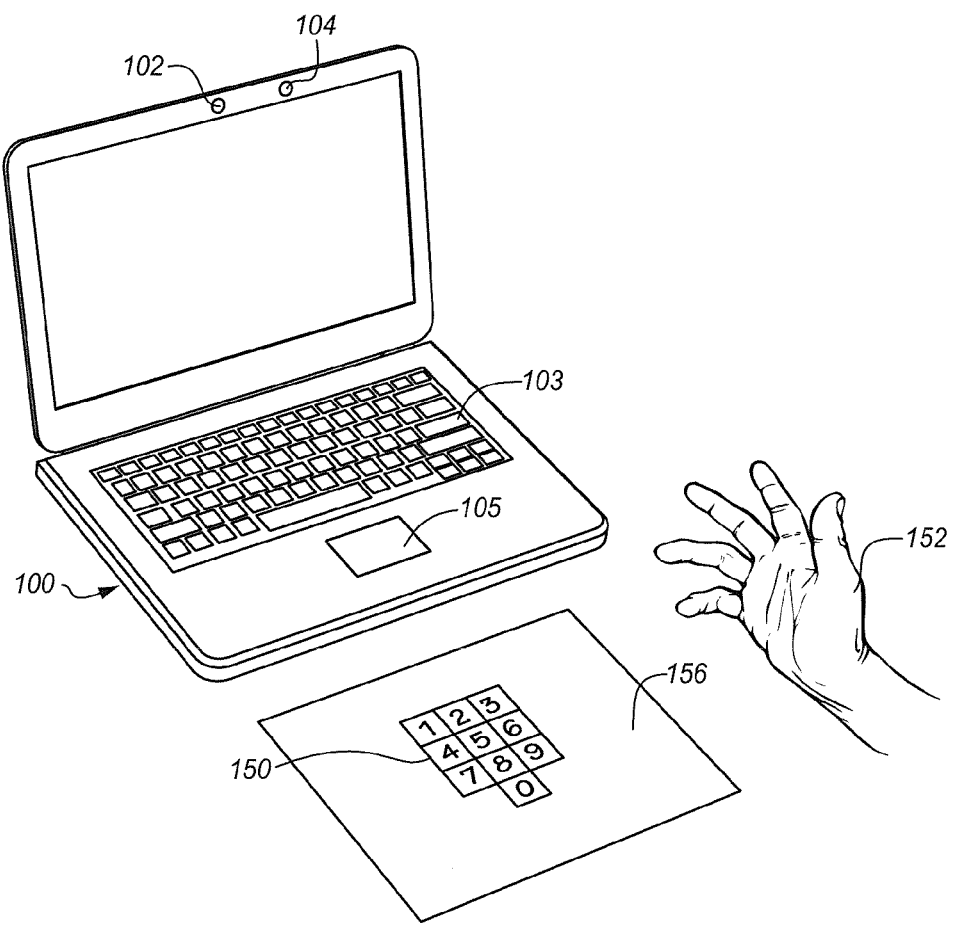
FIG. 5 is a diagram of a computer drawing a keypad for use with a computer system according to another embodiment of the invention.

FIG. 5 shows a similar example, in which instead of a drawn or spoken indication, the user provides an air gesture 152, such as a hand gesture. A hand gesture observed by the camera 102 can be recognized using a library of gestures. The recognized gesture may then be used to select a library of templates or to restrict the library to some subset of templates. The air gesture may be performed by the hand 152, as shown or it may be performed with any other arm, foot, head or other body gesture. Both hands may be used, for example, to indicate an airplane if, as in FIG. 4, an airplane joystick is intended.

As a further alternative, the hand 152, instead of gesturing, may use the keyboard 103 or trackpad 105 to indicate a command to the computer system. This command may be used in the same way as the drawn, spoken, or gestured command. The particular keyboard or trackpad command may be based on context or a special tool or application may be used to make a selection. For a computing system with additional or different input devices, such as a mouse, a jog wheel, a gamepad or other devices, these input devices may be used instead of or in addition to the keyboard and trackpad shown. A menu system displayed on the computer system display may be used to determine a category for matching drawn objects. For example, the user may choose a game mode. This would allow the drawn joystick to be recognized even when the drawing does not closely resemble a joystick.

The voice or written commands may also be used to not only aid the computer system in identifying the object, but also to endow the drawn object with particular physics properties. Voice commands, non-drawn gestures, or touch input may be used in conjunction with the drawn input to alter how the system interprets a drawn symbol. Associated with drawing a circle, the user could say "blue ball." This may be interpreted by the computer system not only to aid the system in identifying the drawn object as a ball but also in coloring the ball blue for display purposes. The computer system may also associate physics and three dimensional properties with the ball that correspond to being a type of ball. The user may then interact with the object with those properties.

The drawn, voice, and gesture input also allows users to adopt a shorthand for their drawings. In the example of FIGS. 2 and 4, the 5 tiles drawn by the user do not closely resemble a joystick. However, with the aid of the drawn, voice, or gesture input, the computer system is still able to recognize the drawing. This principle may be extended to other types of drawings. Accordingly, a user may draw a partial keyboard and say "keyboard" and the system may then interpret the drawing as a full keyboard. The user may alternatively, draw a partial mouse and say "mouse" for a similar result. The keyboard or mouse drawn on the paper may then become a virtual 3D object that may be virtually "moved" or manipulated on the computer system display as the user makes gestures toward or actually physically moves the drawing. The virtual input devices may be configured to adapt to a user's change in hand and other positions.

Figure 6:
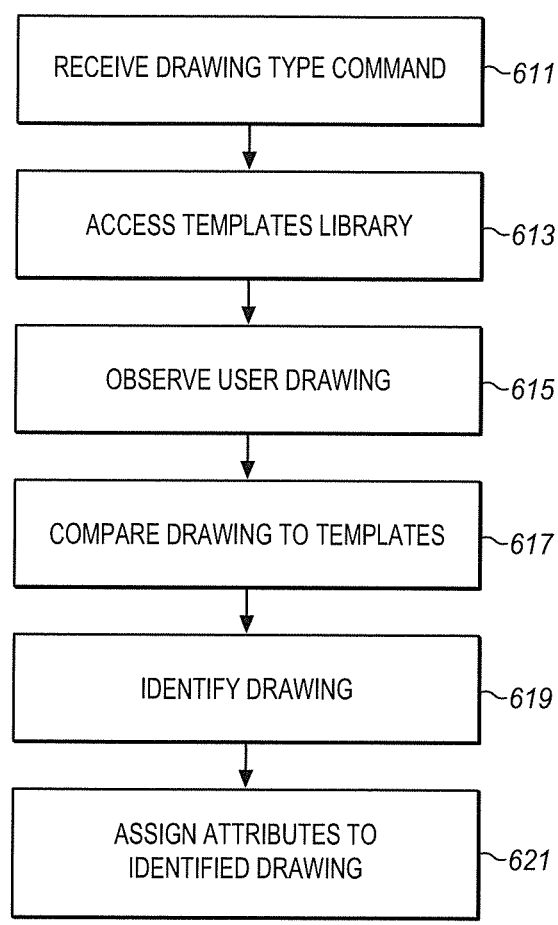
FIG. 6 is a process flow diagram of a computer system interpreting a user drawing according to an embodiment of the invention.

FIG. 6 shows a simplified process flow for implementing the examples described above. At 611 the computer system receives a command indicating the type of drawing that the user intends to make. As mentioned above, this command may be received as a key press, a menu selection, a voice command, or another drawing. At 613, in response to the command the computer system accesses a templates library. The templates will be selected based on the command so that the computer system has a limited set of templates to use. The selected templates will be those associated with the command.

At 615, the computer system observes the user's drawing. The drawing may be observed through a camera or a touch sensitive surface or in another way. The drawing may be corrected for variations in reflectivity in the drawing, for keystone distortion, for inconsistent line thickness caused by the use of poor pen and for other distortions. Using a camera allow the user to use any drawing surface desired while using a known writing surface and pen reduces distortions in the image and errors that might be associated with the camera identifying and observing the drawing. At 617, the computer system compares the drawing to the selected templates. If a match is found, then at 619, the drawing is identified.

In the examples above, the drawing is identified as a keypad or joystick, however, any of a wide variety of other items may be drawn. At 621, the computer system assigns attributes to the identified drawing. These attributes may be accessible functions, user input capabilities, etc. The attributes may be determined using information associated with the template. Accordingly, if the drawing is matched to a keypad template, the template may include information that touching a particular part of the drawing is assigned to a "9" number key press. The template may include the bounds of the "9" key as a part of the template.

Figure 7:
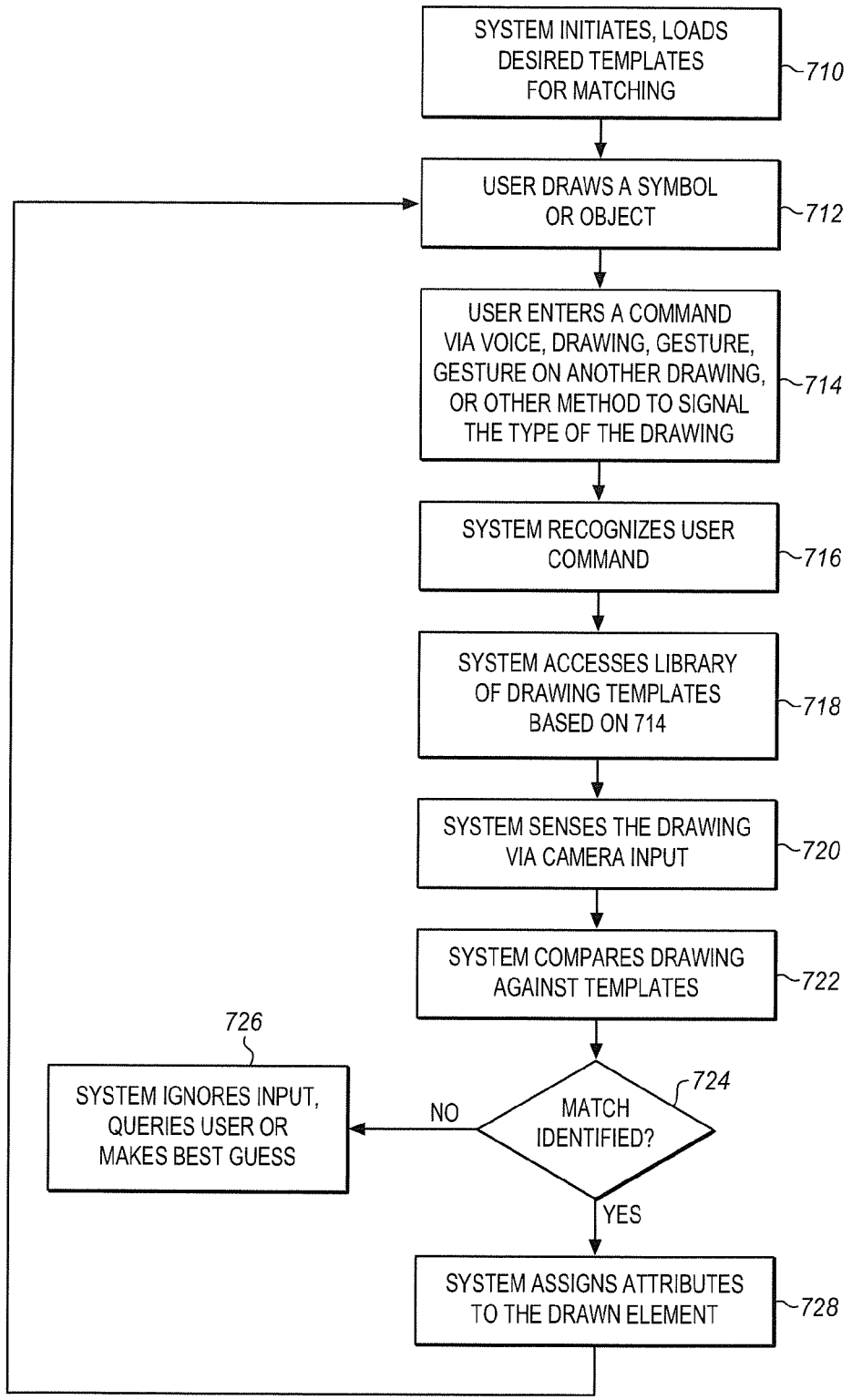
FIG. 7 is a process flow diagram of a computer system interpreting a user drawing according to another embodiment of the invention.

FIG. 7 is an alternative process flow diagram of a process that is performed in the usage examples described above. At 710, the computer system initiates and loads any desired templates for matching. These templates may be templates for matching written words, spoken utterances, and air gestures as well as for drawings. The templates may be supplied by an operating system, a separate drawing recognition application, allowing a user to supply the template, or they may be a part of a game or productivity application.

At 712, the user draws a symbol or object, such as the keypad or joystick shown above. The drawing need not precisely match any particular template or prescribed form for such an object.

At 714, the user enters a command for use in recognizing the use of the object. As mentioned above, the command may be a written word or symbol, a spoken word, a gesture or a command. For example the user may type keypad on the keyboard or select keypad using the trackpad and mouse buttons. The command indicates to the system a type for the drawing which the system can use to reduce the possible choices or even to impose a choice on the system. The two operations of drawing an object at 712 and indicating a type for the object at 714 may be performed in any order. The computer system receives both inputs and then acts accordingly.

At 716, the user receives and recognizes the user command and at 718, the system uses the command to access a library of drawing templates that may be applied to the drawing. If the command is received before the drawing the computer system may recognize the command and access the templates before the user makes the drawing at 712. On the other hand, if the user draws the drawing first, then the system may wait for the command to be received before attempting to match the drawing.

At 720, the computer system senses the drawing through its camera input. Typically this may be done by capturing an image of the drawing using a camera coupled to the computer system. The drawing in the form of a captured image or other digital file is then converted into a digital form that can be matched against other digital files. The form may be a bit map or other image file or it may be an abstracted mathematical representation of the primary features of the user's drawing.

At 722, the computer system compares the observed drawing to the set of drawing templates that it has accessed at 718. This is a limited set of templates based on the receive user command at 716. The comparison may be done more quickly because the number of possible templates is greatly reduced. At 724, the system selects a template and it if matches the observed drawing, then at 728, the system assigns attributes to the drawn elements of the drawing. The system cycles through all of the templates and, if no match is identified, then the system takes some other action. It may simply ignore the drawing. At a later time, the system can try to make another match after the user has returned to the drawing to provide more detail or make corrections to the drawing. The system may also ask the user for assistance by showing some templates to the user for selection or by asking the user to write, say, or type what the object is. For example, the system may query the user by showing two or more possible matches to the drawing and then allowing the user to choose one of the templates as the correct match.

Alternatively, the system may make its best guess and use an approximation of what the user has drawn. The approximation is possible because of the additional command at 714. As mentioned above, it is possible for the user to write joystick and then draw something which does not look exactly like a joystick. The computer system, knowing that the drawing is a joystick, can then impose a joystick design over the drawing rather than accepting only drawings that are very well done. The computer may assign attributes to each of the five tiles that correspond to joystick attributes.

The tiles may be assigned to be buttons, or surfaces, depending on the matched template. In the same way the squares drawn for the keypad may be assigned attributes of various number pad keys. A larger square on the right may be assigned to be a "+" key, for example, while a square on the bottom may be assigned the "0" key. The vague generalized drawing of five tiles can be seen as joystick buttons or surface without looking very much like them.

The process then returns for the next user drawing at 712. The process flow may start over with a completely unrelated drawing. For example a user might draw a joystick in one location on the paper and then draw a WASD key combination or arrow key combination in another location on the paper. The user may then operate the keys with one hand and the joystick with the other.

The process return also allows the user to augment a drawing. In the joystick example, the user might enter a joystick command and add an additional trigger control to the joystick. The computer system will receive the command or may instead recognize that the user is adding to the joystick drawing and then look for a different template to match to the enhanced joystick drawing. With the keyboard, the user may start with only WASD, and then later add a spacebar, shift key or other keys that may be desired for still more functions.

Figure 8:
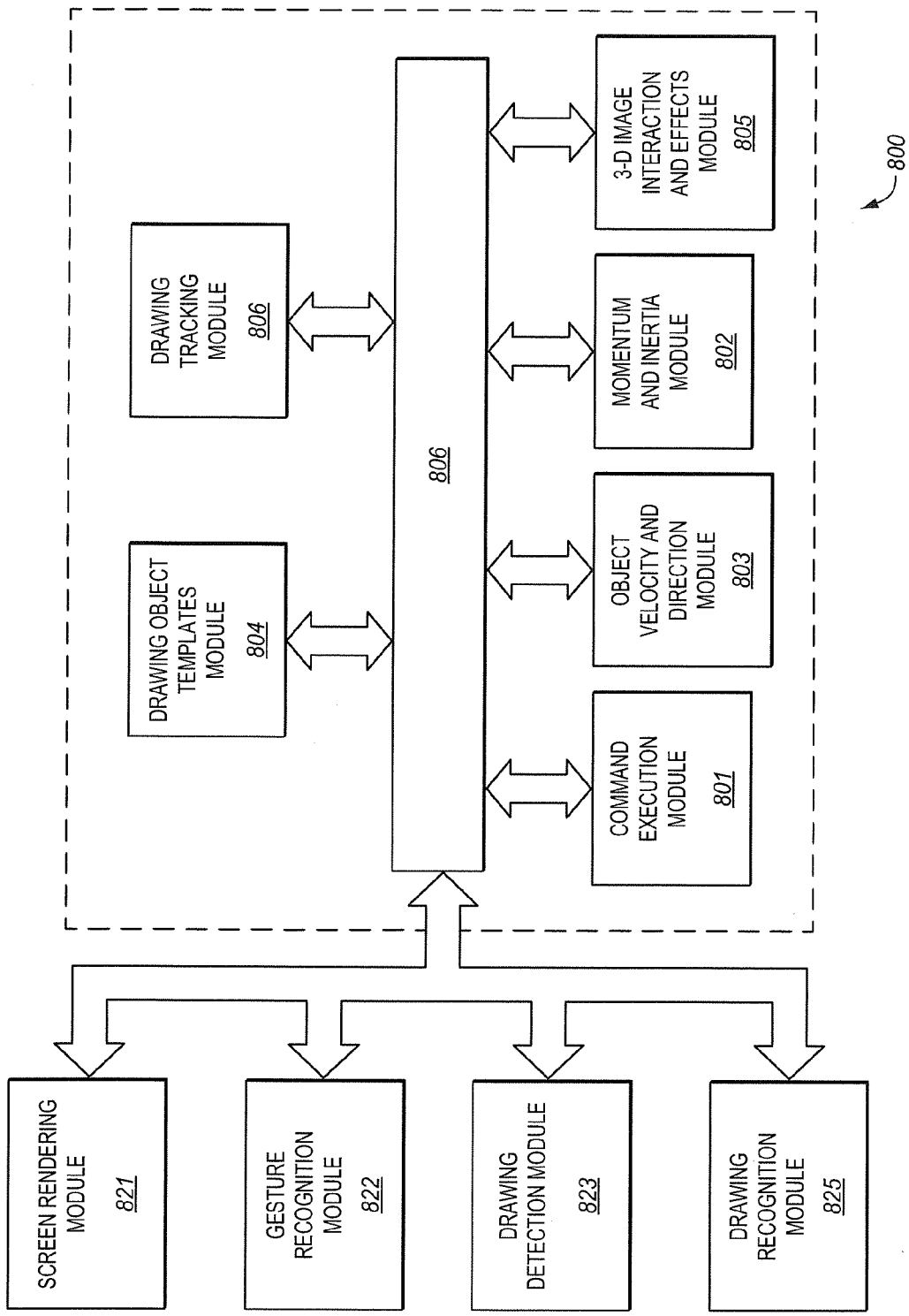
FIG. 8 is block diagram of a computer system suitable for implementing processes of the present disclosure according to an embodiment of the invention.

FIG. 8 is a block diagram of a computing environment capable of supporting the operations discussed above. The modules and systems can be implemented in a variety of different hardware architectures and form factors including that shown in FIG. 9.

The Command Execution Module 801 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 821 draws objects on the one or more multiple screens for the user to see. It can be adapted to receive the data from the Drawing Tracking Module 806, described below, and to render a representation of a drawing on the screen. The screen rendering module also renders interaction between the user and the drawing as commands for the application that the user is operating.

The Gesture Recognition Module 822 may be adapted to recognize and track hand and arm gestures of a user. Such a module may be used to recognize hands, fingers, finger gestures, hand movements and a location of hands relative to drawings. For example, the Gesture Recognition System could for example determine that a user made a body part gesture to push a virtual button on a keyboard, or that the user made a body part gesture to move a virtual control surface of a drawing. The Gesture Recognition System may be coupled to a camera or camera array, a microphone or microphone array, a touch screen or touch surface, or a pointing device, or some combination of these items, to detect gestures and commands from the user.

Any of a variety of techniques for gesture recognition may be used. The system may be used to recognize hands, fingers, finger gestures, hand movements, and location of hands relative to drawing surfaces. If the gesture intersects a previously drawn and recognized object in a number of predefined ways, this module combines the gesture with the attributes of the matched object to determine an action that the computing system will take. If not, the gesture stands as a pure gesture command. The gesture may then be converted to a command to the computer system for execution by the command execution module 801.

The Drawing Detection Module 823 may be equipped with cameras or other sensors to track the position or orientation of a user's hands or a pen. Alternatively, a touch screen or touch surface of the Drawing Detection Module may include a touch screen sensor. Data from the sensor may be fed to hardware, software, firmware or a combination of the same to map the touch gesture of a user's hand on the screen or surface to a corresponding drawing or image. A drawn input can be assumed to be complete when the user pauses or when the user takes an explicit action such as a gesture or voice command.

The Drawing Recognition Module 825 recognizes drawn and written input. It interprets drawn input by matching portions of drawings to template objects stored in the computing device. This module may be initiated to match against the entire library of templates, or it can use other visual input or a user command to cause the match against a subset of the library. The Drawing Recognition Module may also include keystone correction. When images are captured at an angle, they must be corrected for the distortion caused by the angular view before matching against the template library. The keystone correction may be aided by knowledge about the position of the camera and of the writing surface. For the notebook computer example shown, the computer can be configured with a value for the approximate height of a camera at the top of the screen bezel from the bottom of the case resting on the desk. This value is determined by the design of the case and will be the same for each computer with the same case.

The Drawing Object Templates Module 804 stores templates of input devices such as keypads, touchpads, and command buttons. When a user draws an input device with matching characteristics, the attributes of the template will determine the behavior of the drawing and whether user interaction will affect it.

The Drawing Tracking Module 806 tracks the development of a complex drawing in stages and layers. When a user adds elements of a complex object in stages, this module will determine the delta between the current and previous drawn input. If a drawing has moved in relation to the computing device, this module will determine the new orientation to allow continuous input despite the drawing being moved.

The Object and Velocity and Direction Module 803 may be adapted to estimate the dynamics of a drawing being moved as a virtual object, such as its trajectory, velocity (whether linear or angular), momentum (whether linear or angular), etc. by receiving input from the Drawing Tracker Module 806. The Object and Velocity and Direction Module may further be adapted to estimate dynamics of any physics forces, by for example estimating the acceleration, deflection, etc. of a user gesture. The Object and Velocity and Direction Module may also use image motion, size and angle changes to estimate the velocity of objects, such as the velocity of hands and fingers The Momentum and Inertia Module 802 allows a variety of "physics" behaviors based on user input. Fast or slow scrolling or swiping may be attributed with momentum for example. This module would have physics templates that match to user gestures and drawings to add behaviors such as acceleration of an object onscreen. It can use drawing motion and user motion in the plane of the drawing sheet or in a three-dimensional space to estimate the velocity and direction of virtual objects related to the drawing The Momentum and Inertia Module is coupled to the Object and Gesture Recognition System 822 to estimate the velocity of gestures performed by hands, fingers, and other body parts and then to apply those estimates to determine momentum and velocities to virtual objects that are to be affected by the gesture.

The 3-D Image Interaction and Effects Module 805 tracks user interaction with 3-D images that appear to extend out of one or more screens. The influence of objects in the z-axis (towards and away from the plane of the screen) can be calculated together with the relative influence of these objects upon each other. For example, an object thrown by a user gesture can be influenced by 3-D objects in the foreground before the virtual object arrives at the plane of the screen. These objects may change the direction or velocity of the projectile or destroy it entirely. The object can be rendered by the 3-D Image Interaction and Effects Module in the foreground on one or more of the displays.

Described in greater detail in association with FIG. 7, the computing system of FIG. 8 operates with the initiation of the Drawing Detection Module 823. It is initiated through the launching of an application or by other user input such as a voice command. The user creates a drawing and then indicates (as described above) that the drawn input is complete. The Drawing Recognition Module 825 matches the drawing against the template library. When a match of some level of certainty, which may vary by application, is reached, the Drawing Tracking Module 806 associates the drawing with a set of attributes. If the user subsequently gestures on a matched drawing, the system carries out a command according to the matching set of attributes.

Figure 9:
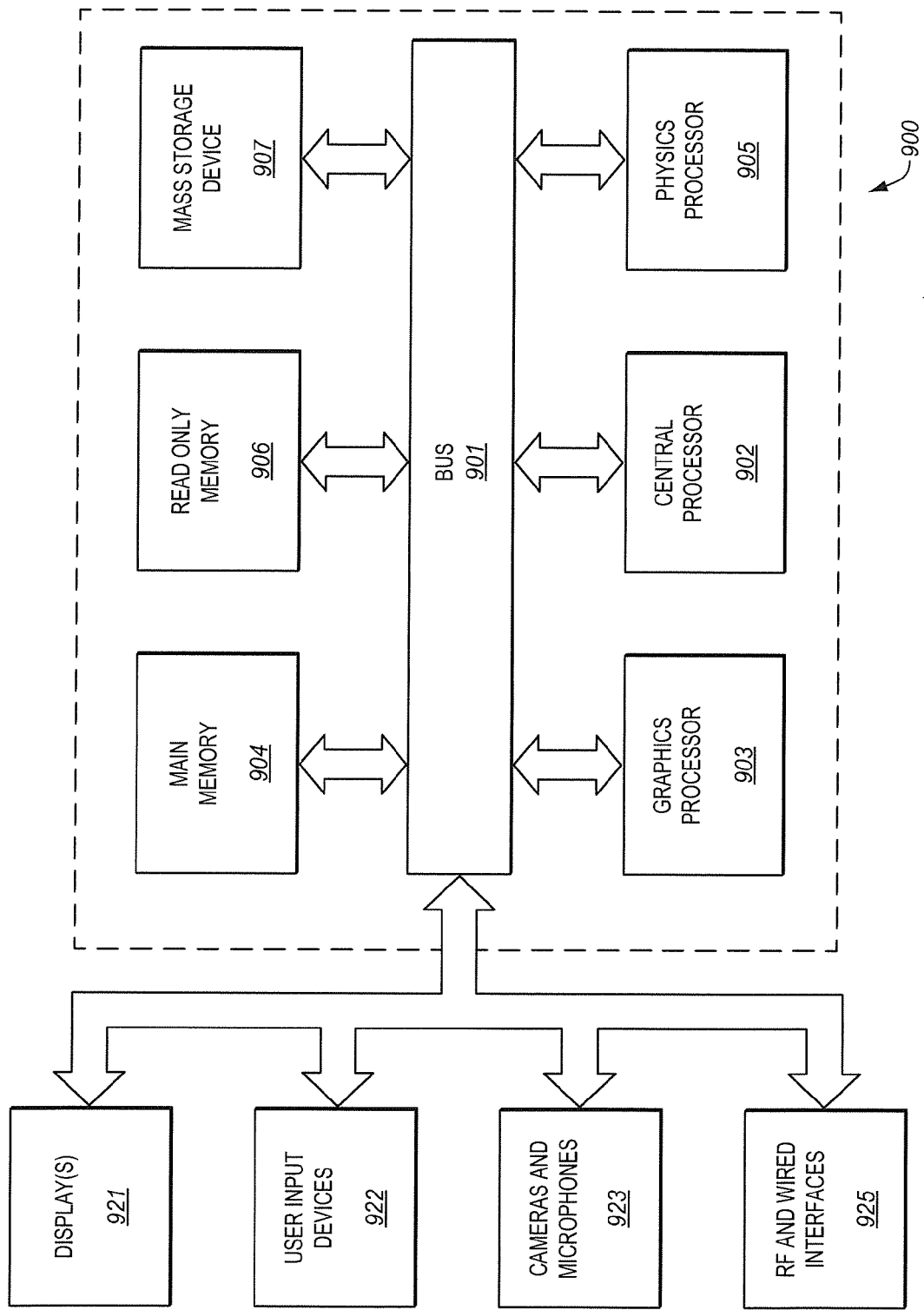
FIG. 9 is a block diagram of a an alternative view of the computer system of FIG. 8 suitable for implementing processes of the present disclosure according to an embodiment of the invention.

FIG. 9 is a block diagram of a computing system, such as a personal computer, gaming console, smartphone or portable gaming device. The computer system 900 includes a bus or other communication means 901 for communicating information, and a processing means such as a microprocessor 902 coupled with the bus 901 for processing information. The computer system may be augmented with a graphics processor 903 specifically for rendering graphics through parallel pipelines and a physics processor 905 for calculating physics interactions as described above. These processors may be incorporated into the central processor 902 or provided as one or more separate processors.

The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device; in addition to the various views and user interactions discussed above.

Typically, user input devices, such as a keyboard with alphanumeric, function, and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Camera and microphone arrays 923 are coupled to the bus to observe gestures, record audio and video and to receive visual and audio commands as mentioned above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients or control surfaces or consoles, or servers via a conventional network infrastructure, including an Intranet or the Internet, for example.

It is to be appreciated that a lesser or more equipped system than the example described above may be preferred for certain implementations. Therefore, the configuration of the exemplary systems 800 and 900 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   receiving at a computer system a command indicating a type of a user input device;
   recognizing the command and determining the indicated type of user input device;
   accessing a library of drawing templates associated with the type of user input device indicated by the command;
   observing at a computer system a user drawing of a user input device corresponding to the type of user input device indicated by the command;
   comparing the observed drawing to only the accessed drawing templates to identify the observed drawing with a selected one of the accessed drawing templates to identify the observed drawing as an identified user input device; and
   assigning attributes to the identified drawing, the attributes determining user input actions that the computer system will take in response to user gestures toward the drawing as if the drawing were the identified user input device.

2. The method of claim 1, wherein the command is one of written text, speech, a second drawing, and a gesture.

3. The method of claim 1, wherein the user input device is a keypad.

4. The method of claim 1, further comprising loading a plurality of drawing templates for use with a loaded application.

5. The method of claim 4, wherein the drawing templates correspond to different configurations and types of user input devices.

6. The method of claim 4, wherein the library of drawing templates is provided by an application running on the computer system.

7. The method of claim 1, wherein accessing a library comprises selecting one from among a plurality of different libraries of drawing templates based on the received command.

8. The method of claim 1, wherein observing a user drawing comprises capturing an image of the drawing using a camera coupled to the computer system.

9. The method of claim 8, further comprising correcting the captured image for distortions caused by the relative position of the camera and the drawing.

10. The method of claim 1, wherein assigning attributes comprises assigning user input control surfaces to the drawing.

11. The method of claim 1, wherein assigning attributes comprises assigning keys for user input to parts of the drawing.

12. A computer-readable non-transitory medium having instructions thereon that, when operated on by the computer, cause the computer to perform operations comprising:
 receiving at a computer system a command indicating a type of a user input device drawing;
 recognizing the command and determining the indicated type of user input device;
 accessing a library of drawing templates associated with the drawing type of user input device indicated by the command;
 observing at a computer system a user drawing of a user input device corresponding to the type of user input device indicated by the command;
 comparing the observed drawing to only the accessed the drawing templates to identify the observed drawing with a selected one of the accessed drawing templates to identify the observed drawing as an identified user input device; and
 assigning attributes to the identified drawing, the attributes determining user input actions an action that the computer system will take in response to user gestures a user gesture toward the drawing as if the drawing were the identified user input device.

13. The medium of claim 12, wherein the command is one of written text, speech, a second drawing, and a gesture.

14. The medium of claim 12, wherein assigning attributes comprises assigning user input control surfaces to the drawing.

15. A system comprising:
 a user input device including a drawing detection module to receive a command indicating a type of user input device and to observe is user drawing;
 a central processing unit including a command execution module to receive the command, to recognize the command and determine the indicated type of user input device, and to cause a drawing object templates module to access a stored library of drawing templates associated with the type of user input device that is indicated by the command; and
 a drawing recognition module of the central processing unit to compare the observed drawing to the only the accessed drawing templates to identify the observed drawing with a selected one of the accessed drawing templates to identify the observed drawing, the attributes determining user input actions that the computer system will take in response to a use gesture toward the drawing as if the drawing were the identified user input device.

16. The system of claim 15, further comprising a gesture recognition module of the user input device to receive, a gesture associated with the recognized drawing and to generate, a command for execution by the command execution module.

17. The system of claim 16, further comprising a display and a three-dimensional effects module to render the execution of commands as three-dimensional images on the display.

18. The system of claim 15, further comprising a camera coupled to the drawing detection module to capture an image of the drawing.

* * * * *